Nov. 28, 1933. W. B. SCHULTE ET AL 1,937,046

ELECTRIC BATTERY

Filed May 16, 1929 2 Sheets-Sheet 1

INVENTORS
W. B. Schulte
J. S. Zook
BY
Pennie, Davis, Marvin & Edmonds
ATTORNEYS

Nov. 28, 1933. W. B. SCHULTE ET AL 1,937,046
ELECTRIC BATTERY
Filed May 16, 1929    2 Sheets-Sheet 2
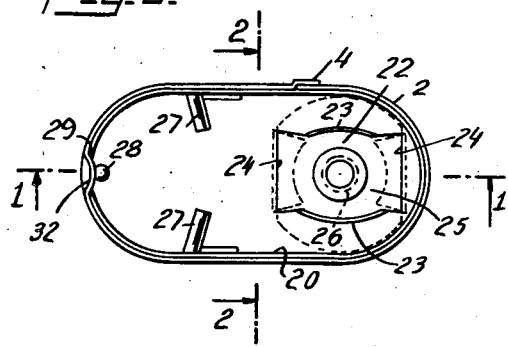
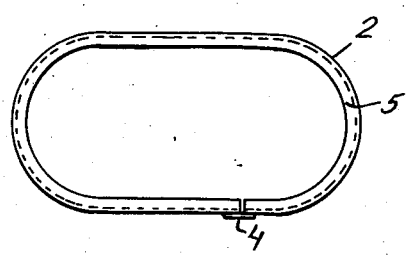
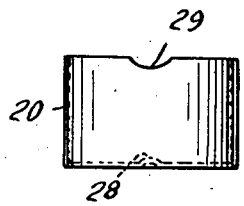
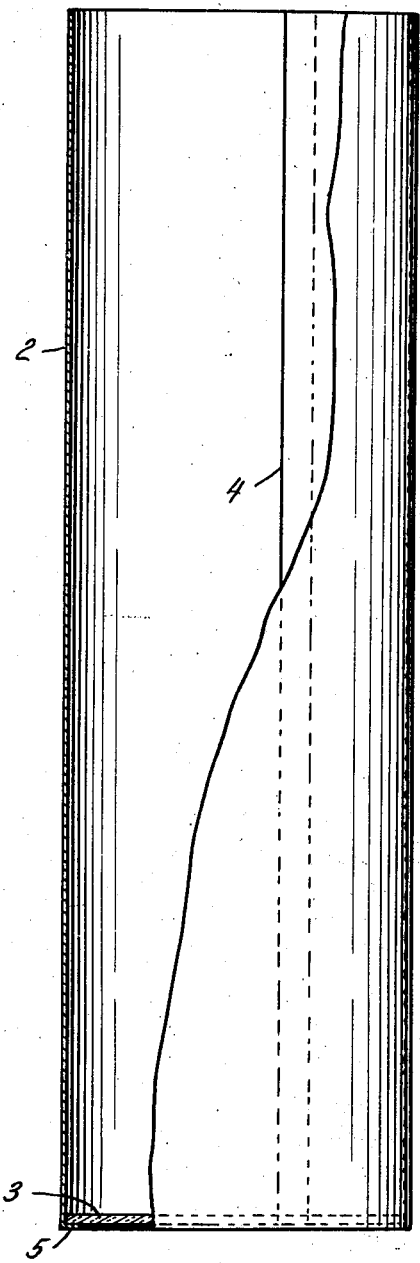
INVENTORS
W. B. Schulte
J. S. Zook
BY
Pennie, Davis, Marvin & Edmonds
ATTORNEYS Patented Nov. 28, 1933

1,937,046

UNITED STATES PATENT OFFICE 1,937,046

ELECTRIC BATTERY

Walter B. Schulte and John S. Zook, Madison, Wis., assignors to Burgess Battery Company, Madison, Wis., a corporation of Wisconsin Application May 16, 1929. Serial No. 363,451

2 Claims. (Cl. 136—108)

This invention relates to an improved electric battery and specifically to a dry cell battery encased in a metal container. It is of such construction that it may be used in a hand lamp of the type described and claimed in the John S. Zook Patent No. 1,701,093. It is an improvement in construction over the battery shown in that patent.

It is an object of this invention to provide a battery which is easy to assemble, cheap to make, which may be made very attractive in appearance and which is of rugged construction. Other objects will become apparent when the accompanying specification is read in conjunction with the drawings in which:

Fig. 3 is a top view of the battery;

Fig. 4 is a partial cross sectional elevation of the container;

Fig. 5 is a top view of the container in partial cross section without the bottom closure; and Fig. 6 illustrates an indentation in the top edge of a cup forming a part of the battery unit.

Figure 1:
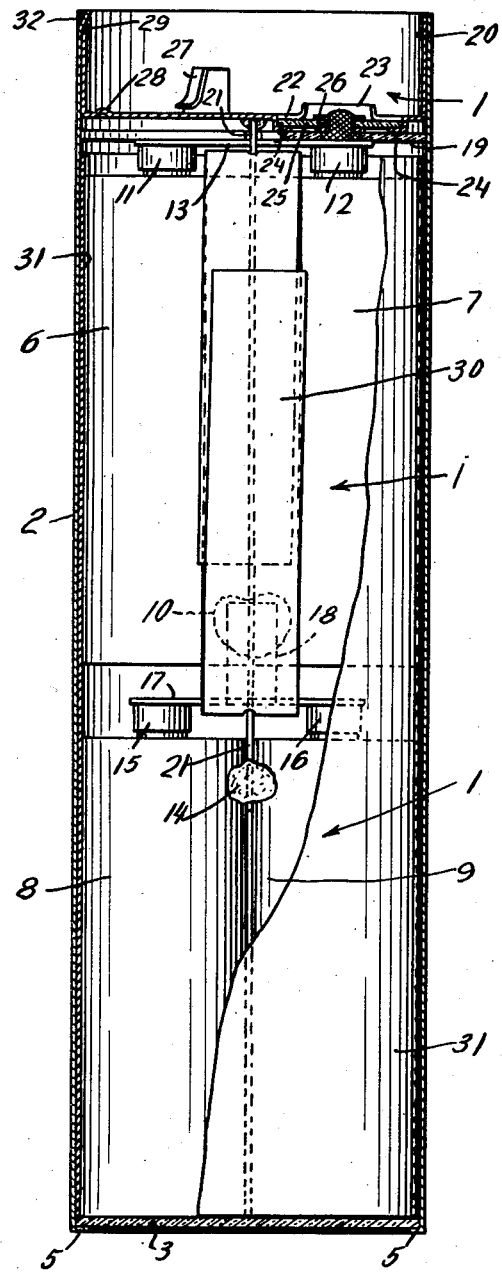
Fig. 1 is a partial cross sectional elevation along the lines 1—1 of Fig. 3.
Figure 2:
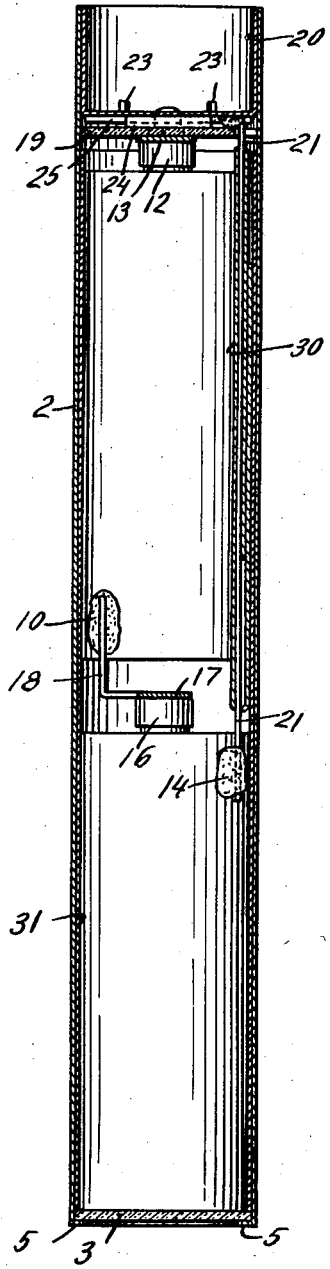
Fig. 2 is a cross sectional elevation along the lines 2—2 of Fig. 3 when viewed in the direction of the arrows.

In the form of the invention shown in Figs. 1, 2 and 3 of the drawings a battery unit 1, 1, 1, is enclosed in an open top metal container 2 having an insulating sheet bottom closure 3 which is preferably made of heavy paper. The bottom of the container may be made of metal similar to the side wall. Although such a metal bottom may be covered with an insulating sheet this is not necessary in the preferred form of construction as is shown in the drawings. The metal container is made by shaping a flat metal sheet, which preferably has been lithographed previously with appropriate decorative designs, into a flattened-oval shape open-ended tube shown in Figs. 4 and 5. The tube may be formed by an inter-locking crimp at the seam 4. The bottom edge of the tube is turned in or flanged at substantially right angles to form a ledge 5. The insulating sheet bottom closure 3 is inserted as shown and rests on this ledge to form an open-top metal container. The height of the container above the bottom closure is about the same as the battery unit to be enclosed therein.

The battery unit 1, 1, 1, which is inserted into the metal container 2 is first assembled independently of the container. In the preferred form two or more sets of two or more cylindrical cells are connected electrically in parallel series relation. In the unit shown in Figs. 1 and 2, two sets of two cells, 6—7 and 8—9 are so connected that the two laterally adjacent upper cells 6 and 7 are connected in parallel, and the two laterally adjacent lower cells 8 and 9 are connected likewise. The zinc cans of the two upper cells 6 and 7 are electrically connected as by soldering at 10, while the positive poles 11 and 12 of said cells respectively may be connected electrically by a flat metal strip 13 soldered thereto. The zinc cans of the lower cells 8 and 9 are electrically connected as by soldering at 14 while the positive poles 15 and 16 of said cells respectively may be connected electrically by a flat metal strip 17 soldered thereto. Said metal strip 17 may be made integral with connector 18 which is used for making electrical connection with the upper pair of cells. The two pairs of cells are mounted in a jig and the upper and lower pairs of cells so spaced apart that the battery unit 1, 1, 1, will be of approximately the same length as the height of the container 2. Connecting strip 18 is soldered to the upper zinc cans by means of solder 10. The positive poles of the bottom cells therefore are at the same potential as the zinc cans of the upper cells. An insulating sheet 19, preferably of flattened-oval shape and preferably made of heavy water-proofed paper and containing a hole registering with positive pole 12 is then placed on the connector 13. A metal cup 20 having a wire lead 21 depending therefrom is then arranged above said insulating sheet 19. Wire 21 is soldered or otherwise fastened to the bottom of cup 20 as shown. A sheet of insulating material 30 such as paraffined paper or tar lined kraft is folded and slipped over wire 21 as shown in Figs. 1 and 2. Wire 21 is thus insulated from the zinc cans of cells 6 and 7. Wire 21 is soldered to can 8 or 9 at 14, and maintains the proper distance between the top of the cup 20 and the bottom of the unit as previously explained.

The cup is of a flattened-oval shape and is preferably of such size and shape that it forms a snug sliding fit into container 2. It is provided with an opening 22 of irregular shape adjacent of one end of the bottom. This opening allows the positive pole 12 of cell 7 to be exposed through the hole in insulating sheet 19. The side edges of opening 22 are flanged up at 23. Although the cup may be used with the positive pole 12 or connector 13 exposed through the hole in insulating strip 19 as described in the Zook patent the construction shown in Figs. 1 to 3 is preferred, such construction being the subject matter of John S. Zook application Serial No.

312,809, filed October 16, 1928 (now Patent No. 1,763,874, granted June 17, 1930). In this preferred construction the ends of opening 22 are flanged down at the ends 24. A substantially rectangular piece of insulating sheet material 25 is adapted to be arranged in this opening. The member 25 is provided with a perforation 26 into which a metal eyelet may be securely fastened by any suitable means, such as riveting. The insulating member 25 is of a width substantially equal to the length of opening 22 and is adapted to slide sideways into place between flanges 24 and the bottom of cup 20 as shown in Figs. 1 and 2. The insulating member 22 with the eyelet mounted therein is so positioned that after the cup 20 is in position at the top of insulating sheet 19, the eyelet and hole 26 and the hole in insulating sheet 19 are directly over pole 12. A drop of fused conducting material, such as solder, is then allowed to run into and fill the hole of the eyelet and run down upon the top surface of pole 12 or conductor 13. This provides a permanent and rigid electrical connection between the two. The cup 20 has wings 27 and a lug 28 which are punched in from the sides and bottom respectively of cup 20 for the purposes set forth in the Zook patent. The cup 20 also has an indentation cut out of its upper edge preferably at 29 as shown in Figs. 1, 3 and 6 and for a purpose to be hereinafter set forth. The assembly of the battery unit is now complete.

A sheet of flexible, insulating, sheet material 31, such as wax paper or tar-lined kraft, is wrapped around the battery unit below the cup 20. It need only cover the portions of zinc cans 6 and 7 that are adjacent the sheet metal container 2 as these zinc cans are at a different potential than the container. Zinc cans 8 and 9 which are electrically connected by wire 21 to cup 20 are at the same potential as the container and therefore need not be insulated therefrom. For convenience the insulation preferably covers the unit from the base of the cup to the bottom of cells 8 and 9. The battery unit 1, 1, 1, and insulation 31 are now inserted into container 2. Since the cup 20 constituting the top of the battery unit, is of the same lateral contour and size as the cross-section of the assembled cells and since the cup forms a snug sliding fit into the container 2, the entire battery unit fits slidably and preferably snugly into the container. After insertion of the battery unit the top edge of the container is crimped inward at the portion of the cup 10 adjacent the point 29 to form the crimp 32 and thereby lock the battery unit into the metal container. To avoid interference between seam 4 and zinc cans 6, 7, 8 and 9, the former is arranged to occur intermediate the portions of container 2 which are adjacent the cells.

The above preferred form of battery may be modified in various ways as will be apparent to those skilled in the art. Such variations are within the scope of my invention. The cells may be reversed, that is, the positive lead may contact with the metal cup and the negative lead may contact with the eyelet. Under those conditions it is necessary to insulate all of the cells from the metal container. When more than two cells are connected in parallel in each group the necessary connections are readily apparent to those skilled in the art. It is possible to omit insulating sheet 31 either by coating the zinc cans of cells 6 and 7 with an insulating material such as Duco, bakelite, rubber, or the like, or by coating the inside of can 2 with such an insulating material. Insulating sheet 30 may be omitted if wire 21 is coated with an insulating material. It is also possible to have the positive poles 15 and 16 of the lower set of cells make direct contact with the bottoms of the zinc cans of cells 6 and 7 and omitting the soldering operation as is the present day practice with tubular flashlight batteries.

We claim:
1. A dry cell battery comprising a multiplicity of sets of laterally adjacent, parallel connected cells, one set positioned above the other, said sets of parallel connected cells being connected in series, a metal cup mounted at the top of said cells, and a metal shell open-top container in which said cells and cup are snugly enclosed, said metal shell comprising a metal sheet bent laterally to conform to the lateral contour of said cup, the edges of said sheet being united by a longitudinal interlocking crimp, said crimp being arranged to occur intermediate the portion adjacent said cells.

2. A battery unit comprising a multiplicity of sets of laterally adjacent, parallel connected cells, one set positioned above the other, said sets of parallel connected cells being connected in series, a metal cup mounted at the top of said cells and forming one terminal of said battery circuit and means for spacing and electrically connecting said sets of cells, said means consisting of a stiff conductor attached to said upper and lower sets of cells, the attachment to one of said sets of cells being at a point upon the side of the zinc can of a cell of said set arranged longitudinally so as to provide a predetermined overall length of battery unit.

WALTER B. SCHULTE.
JOHN S. ZOOK.